United States Patent
Lee (10) Patent No.: US 10,942,132 B2
(45) Date of Patent: Mar. 9, 2021

(54) APPARATUS AND METHOD FOR INSPECTING GLASS SUBSTRATE

(71) Applicant: Samsung Display Co., Ltd., Yongin-si (KR)

(72) Inventor: Jin Ho Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/679,919

(22) Filed: Nov. 11, 2019

(65) Prior Publication Data
US 2020/0150052 A1 May 14, 2020

(30) Foreign Application Priority Data
Nov. 12, 2018 (KR) .................. 10-2018-0138320

(51) Int. Cl.
*G01N 21/896* (2006.01)
*G06T 7/00* (2017.01)
*G01N 21/88* (2006.01)

(52) U.S. Cl.
CPC ....... *G01N 21/896* (2013.01); *G01N 21/8851* (2013.01); *G06T 7/0004* (2013.01); *G01N 2021/8887* (2013.01)

(58) Field of Classification Search
CPC .... G01N 21/9501; G01N 21/94; G01N 21/47; G01N 21/9505; G01N 21/958; G01N 21/55; G01N 21/896; G01N 2021/8822; G01N 21/9513; G06T 7/0002; G06T 7/001; G06T 7/0008; G06T 2207/30148

USPC ......... 356/237.1–237.5, 239.1, 239.2, 239.4, 356/239.7
See application file for complete search history.

(56) References Cited

U.S. PATENT DOCUMENTS

| | | | | |
|---|---|---|---|---|
| 5,691,811 A | * | 11/1997 | Kihira | G01N 21/896 356/239.1 |
| 6,798,504 B2 | * | 9/2004 | Sato | G01N 21/9501 356/237.2 |
| 7,199,386 B2 | * | 4/2007 | Capaldo | G01N 21/95 250/208.1 |
| 7,420,671 B2 | * | 9/2008 | Sonda | G01N 21/896 356/239.1 |
| 7,539,583 B2 | * | 5/2009 | Fu | G01N 21/9501 382/144 |

(Continued)

FOREIGN PATENT DOCUMENTS

| | | |
|---|---|---|
| KR | 10-1867015 B1 | 6/2018 |
| WO | WO 94/18643 * | 8/1994 |

*Primary Examiner* — Hoa Q Pham
(74) *Attorney, Agent, or Firm* — Lewis Roca Rothgerber Christie LLP (57) ABSTRACT

An apparatus and method for inspecting a glass substrate. The apparatus for inspecting a glass substrate includes a stage configured to support the glass substrate, a first light source for irradiating light onto a surface of the glass substrate at a first angle, a first camera for capturing scattered light of the light irradiated from the first light source, a second light source for irradiating light onto the surface of the glass substrate at a second angle greater than the first angle, a second camera for capturing reflected light and scattered light of the light irradiated from the second light source, and a defect detection unit for detecting a defect of the glass substrate using a first image provided by the first camera and a second image provided by the second camera.

19 Claims, 8 Drawing Sheets

(56) References Cited

U.S. PATENT DOCUMENTS

| | | | |
|---|---|---|---|
| 7,567,344 B2* | 7/2009 | LeBlanc | G01N 21/896 356/237.2 |
| 8,027,036 B2* | 9/2011 | Kim | G01N 21/896 356/237.1 |
| 8,803,968 B2* | 8/2014 | Kim | G01N 21/896 348/135 |
| 2004/0207836 A1* | 10/2004 | Chhibber | G01N 21/9501 356/237.4 |
| 2005/0018183 A1* | 1/2005 | Shortt | G01B 11/0633 356/239.1 |
| 2008/0198602 A1* | 8/2008 | Brittain | G01N 21/8806 362/253 |
| 2013/0077092 A1* | 3/2013 | Sasazawa | G01N 21/94 356/237.5 |
| 2019/0147577 A1* | 5/2019 | Lee | G01N 21/95607 382/149 |

* cited by examiner

| 2.4 | 2.5 | 2.5 | 2.3 | — A |
|-----|-----|-----|-----|
| 2.5 | 2.5 | 2.5 | 2.5 |
| 2.5 | 2.5 | 2.3 | 2.3 |
| 2.4 | 3.4 | 2.9 | 2.4 |
| 2.5 | 3.0 | 2.7 | 2.3 |

| 1.5 | 1.9 | 1.9 | 1.0 |
|-----|-----|-----|-----|
| 1.6 | 1.6 | 1.8 | 1.5 |
| 1.8 | 1.6 | 1.0 | 1.1 |
| 1.4 | 9.2 | 4.0 | 1.4 |
| 1.7 | 4.6 | 3.0 | 1.1 |

APPARATUS AND METHOD FOR INSPECTING GLASS SUBSTRATE

CROSS-REFERENCE TO RELATED APPLICATION

The application claims priority to and the benefit of Korean Patent Application No. 10-2018-0138320, filed Nov. 12, 2018, the entire content of which is hereby incorporated by reference.

BACKGROUND

1. Field

Exemplary embodiments of the present disclosure relate generally to an apparatus and method for inspecting a glass substrate, and more particularly, to an apparatus and method for inspecting a glass substrate which can detect a defect of the glass substrate using a digital image of the glass substrate.

2. Description of the Related Art

In general, a glass substrate used for manufacturing a flat panel display device such as a liquid crystal display (LCD), an organic light emitting display (OLED) or the like is very thin and can be easily broken by a slight impact or a temperature change.

For instance, when a glass substrate has minute defects such as micro voids and micro cracks, the glass substrate may be easily broken while handling or manufacturing a display device. In addition, when impurities penetrate into the glass substrate through the minute defects, poor products or deterioration of quality may be caused due to contamination.

The above information disclosed in this section is only for understanding the background of the inventive concepts, and, therefore, may contain information that does not form prior art.

SUMMARY

One or more exemplary embodiments provide an apparatus and method for inspecting a glass substrate which can detect a defect of the glass substrate through a digital image processing technique.

One or more exemplary embodiments also provide an apparatus and method for inspecting a glass substrate which can detect a defect of the glass substrate more accurately and easily than related art methods.

One or more exemplary embodiments also provide an apparatus and method for inspecting a glass substrate which can effectively prevent loss of manufacturing cost due to the erroneous determination of a defect.

According to some exemplary embodiments, an apparatus for inspecting a glass substrate may include a stage configured to support the glass substrate; a first light source for irradiating light onto a surface of the glass substrate at a first angle; a first camera for capturing scattered light of the light irradiated from the first light source; a second light source for irradiating light onto the surface of the glass substrate at a second angle greater than the first angle; a second camera for capturing reflected light and scattered light of the light irradiated from the second light source; and a defect detection unit for detecting a defect of the glass substrate using a first image provided by the first camera and a second image provided by the second camera.

The stage may include a driving unit for moving the glass substrate in one direction.

The first light source and the first camera may be positioned before the second light source and the second camera along the one direction.

The first and second cameras may be arranged in a direction normal to the stage. Each of the first and second cameras may be line scan cameras. Each of the first and second cameras may include a CMOS or a CCD.

The first and second light sources may be configured to irradiate the light in a line. Each of the first and second light sources may include a series of LEDs arranged in a bar shape.

The defect detection unit may include a weight calculation unit for calculating standard deviations for pixels of each region of a series of regions in the second image and calculating weights for each region of the series of regions using the standard deviations; an image generation unit for applying the weights to the first image to generate a corrected first image; and a defect determination unit for determining a defect of the glass substrate using the corrected first image.

The weight calculation unit may be configured to divide the second image into a series of regions, and calculate the standard deviations using grayscale values and average grayscale values of the pixels of each region of the series of regions. Each standard deviation of the standard deviations may be calculated by following equation 1.

$$s = \sqrt{\frac{\sum_{i=1}^{n}(X_i - \overline{X})^2}{n-1}} \qquad \text{Equation 1}$$

Here, s is the standard deviation of one region of the series of regions, n is a number of pixels of the one region, $X_i$ is a grayscale value of an i-th pixel (i is a natural number from 1 to n) of the one region, and $\overline{X}$ is an average grayscale value of the pixels.

According to some exemplary embodiments, a method for inspecting a glass substrate may include providing the glass substrate; irradiating light from a first light source to a first region of the glass substrate and capturing a first image of the first region of the glass substrate using a first camera; irradiating light from a second light source to the first region of the glass substrate and capturing a second image of the first region of the glass substrate using a second camera; calculating weights corresponding to pixels of the second image; applying the weights to pixels of the first image to generate a corrected first image; and detecting a defect of the glass substrate using the corrected first image.

The glass substrate may be moved in one direction while inspecting the glass substrate.

The first camera may capture scattered light of the light irradiated from the first light source.

The second camera may capture reflected light and scattered light of the light irradiated from the second light source.

The calculating the weights may include dividing the second image into a plurality of regions, calculating standard deviations for pixels using grayscale values and average grayscale values of the pixels of each of the plurality of regions, and converting the standard deviations for each of the pixels into weights according to a reference value table. Each of the standard deviations may be calculated by following equation 2.

$$s = \sqrt{\frac{\sum_{i=1}^{n}(X_i - \overline{X})^2}{n-1}}$$

Equation 2

Here, s is a standard deviation, n is a number of pixels, $X_i$ is a grayscale value of an i-th pixel (i is a natural number from 1 to n), and $\overline{X}$ is an average grayscale value of the pixels.

The corrected first image may be generated by multiplying grayscale values of the pixels of the first image by the weights.

The detecting the defect of the glass substrate may include comparing grayscale values of pixels of each region of the corrected first image with a threshold value to binarize the grayscale values, connecting pixels having binarized values of 1 to each other, and determining the defect when an aggregate length of the pixels connected to each other is greater than a reference value.

The connecting pixels may include connecting only the pixels within a predetermined range.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION

Hereinafter, preferred embodiments of the invention will be described in detail with reference to the accompanying drawings. The following embodiments are provided so that those skilled in the art will be able to fully understand the invention. The embodiments can be modified in various ways. The scope of the invention is not limited to the embodiments described below.

In the embodiments, the terms first, second, etc. are not used in a limiting sense and are used for the purpose of distinguishing one element from another. Also, an expression representing the singular may include an expression representing a plurality unless it is clearly different in context.

Also, when a layer, a region, an element, or the like is referred to as being "connected" in the embodiment, it will be understood that when a layer, a region, or an element is directly connected as well as layers, regions, or elements are indirectly connected to each other. For example, when a layer, a region, an element, or the like is electrically connected, not only when a layer, a region, an element, or the like is directly connected each other, as well as a case where another layer, region, element, or the like is interposed therebetween and indirectly connected thereto.

The sizes of the elements shown in the drawings may be exaggerated or reduced for convenience of explanation. For example, the size and thickness of each element are arbitrarily shown for convenience of explanation, and thus the invention is not necessarily limited to those shown in the drawings.

Figure 1:
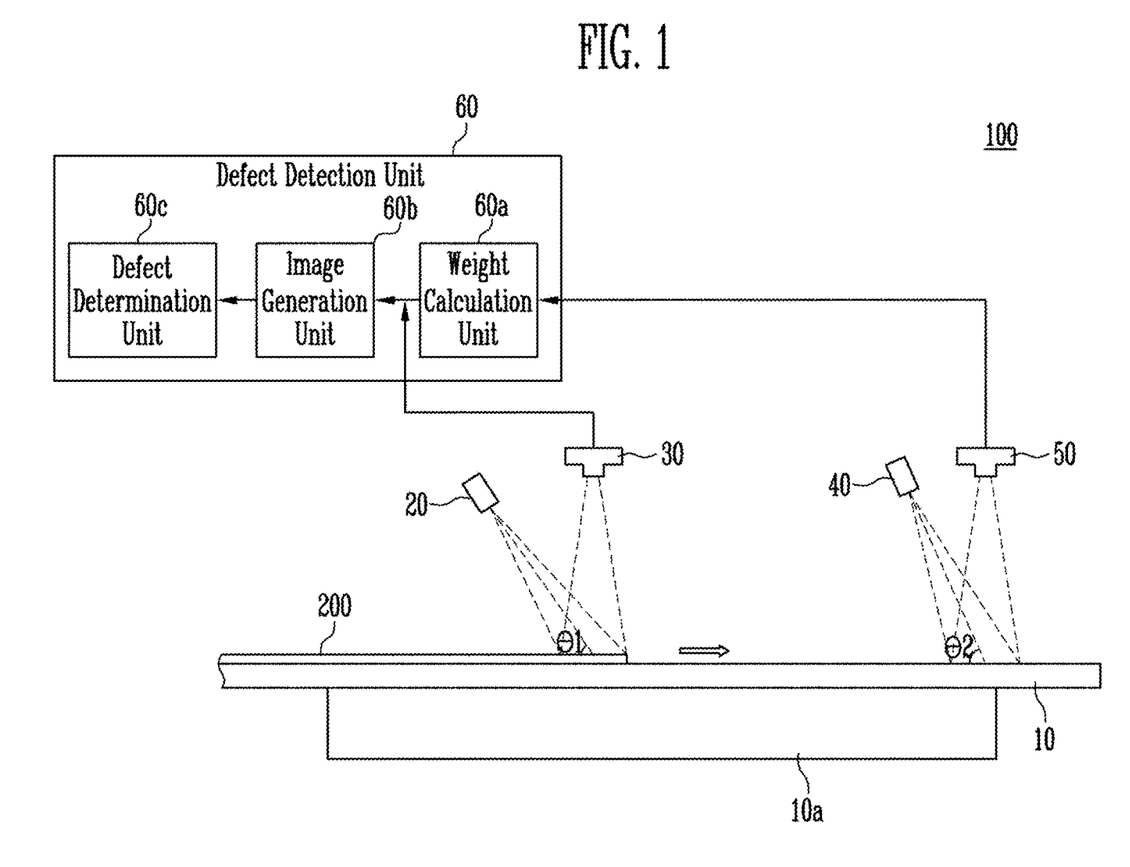
FIGS. 1 and 2 are schematic block diagrams of an apparatus for inspecting a glass substrate according to an embodiment of the present disclosure.
Figure 2:
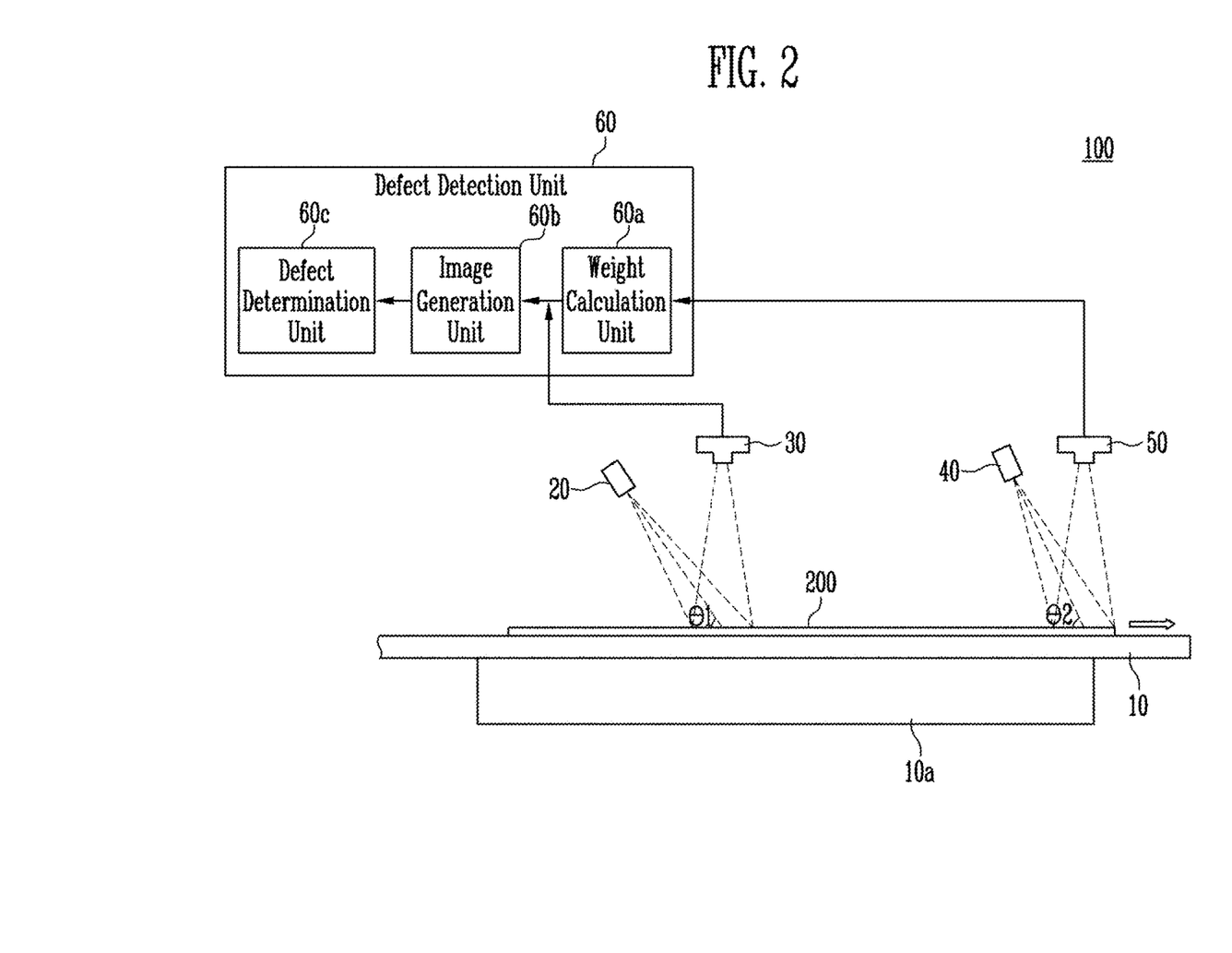

FIGS. 1 and 2 are schematic block diagrams of an apparatus for inspecting a glass substrate according to an embodiment of the invention.

Referring to FIGS. 1 and 2, an apparatus 100 for inspecting a glass substrate may include a stage 10 on which a glass substrate 200 is placed, a first optical system disposed on one side (e.g., an upper side) of the stage 10 and including a first light source 20 and a first camera 30, a second optical system disposed on the same side (e.g., the upper side) of the stage 10 and including a second light source 40 and a second camera 50, and a defect detection unit 60 for detecting a defect of the glass substrate 200 using a first image providing by the first camera 30 and a second image provided by the second camera 50. In the illustrated embodiment, the second optical system, including the second light source 40 and the second camera 50, is spaced apart from the first optical system, including the first light source 20 and the first camera 30, in a direction along which the apparatus 100 is configured to move the glass substrate 200 on the stage 10.

In one or more embodiments, the stage 10 may be, for example, in the form of a flat plate so that the glass substrate 200 as an object to be inspected can be placed thereon. In addition, the stage 10 may include a driving unit 10a configured to move the glass substrate 200 in one direction at a predetermined speed while inspecting the glass substrate 200. The glass substrate 200 can be moved to different positions with respect to the first optical system and the second optical system by the driving unit 10a.

FIG. 1 shows a position of the glass substrate 200 at the start of an inspection, and FIG. 2 shows a state in which the glass substrate 200 is moved in one direction by the driving unit 10a.

Although one glass substrate 200 is shown in FIGS. 1 and 2, the inspection can proceed in a state which a plurality of glass substrates 200 are arranged in the form of a line on the stage 10.

The first light source 20 and the second light source 40 may irradiate light in the form of a line (e.g., the first light source 20 and the second light source 40 may irradiate collimated or substantially collimated light) to a predetermined region of the glass substrate 200. The first light source 20 and the second light source 40 may include, for example, a plurality of light emitting diodes (LEDs) that emit white light. The light in the form of a line can be obtained by arranging the plurality of light emitting diodes (LEDs), for example, in a bar shape.

In addition, the first light source 20 and the second light source 40 may further include an optical element such as a lens, a filter, or the like for increasing efficiency and uniformity of the light and for adjusting an optical path in parallel.

The first camera 30 and the second camera 50 may be arranged in a direction normal to the stage 10 (e.g., the first camera 30 and the second camera 50 may be oriented orthogonal or substantially orthogonal to the stage 10). For example, the first camera 30 and the second camera 50 may be arranged so as to face the stage 10 within a range of 0° to 10° relative to a normal of the stage 10.

In one embodiment, each of the first camera 30 and the second camera 50 may be a line scan camera capable of sequentially photographing a plurality of line-shaped regions defined in a direction perpendicular or substantially perpendicular to a moving direction of the glass substrate 200 on the stage 10, as shown by the arrows in FIGS. 1 and 2. The line scan camera may sequentially photograph the plurality of line-shaped regions to obtain an image of the entire region of the glass substrate 200.

Each of the first camera 30 and the second camera 50 may include, for example, a charge-coupled device (CCD) or a complementary metal-oxide semiconductor (CMOS) as an imaging device for obtaining a digital image.

In one embodiment, the first light source 20 may be arranged to irradiate light at a first angle θ1 with respect to a surface of the glass substrate 200 (e.g., an upper surface of the glass substrate 200 facing away from the stage 10) and the first camera 30 may be arranged to capture scattered light (of the light irradiated from the first light source 20) irregularly reflected on the surface of the glass substrate 200.

The scattered light may include light reflected from a surface defect of the glass substrate 200 or the like.

The first camera 30 is arranged substantially perpendicularly to the surface of the glass substrate 200 and the first light source 20 is arranged such that an optical axis of the first light source 20 is at the first angle θ1 with respect to the surface of the glass substrate 200. Additionally, in the illustrated embodiment, the first light source 20 is positioned before (i.e., ahead of) the first camera 30 along a direction in which the apparatus 100 is configured to move the glass substrate 200 on the stage 10. In this state, when the light irradiated from the first light source 20 is totally reflected on the surface of the glass substrate 200, an image with a dark (black) background can be captured. In addition, when the light irradiated from the first light source 20 is irregularly reflected by a part of the glass substrate 200 and scattered light is generated, an image in which a part is bright on a dark (black) background can be captured.

The first optical system configured as described above is utilized in a dark field method, which may be advantageous for binarization of image data since a defective portion is captured bright and a normal portion is captured dark.

In addition, the second light source 40 is arranged to irradiate light to the surface of the glass substrate 200 at a second angle θ2 greater than the first angle θ1 and the second camera 50 is arranged to capture reflected light and scattered light of the light irradiated from the second light source 40.

The reflected light may include light reflected on the surface of the glass substrate 200, and the scattered light may include light reflected from the surface defect of the glass substrate 200 or the like.

The second camera 50 is arranged substantially perpendicularly to the surface of the glass substrate 200 and the second light source 40 is arranged such that an optical axis is at the second angle 82 with respect to the surface of the glass substrate 200. Additionally, in the illustrated embodiment, the second light source 40 is positioned before (i.e., ahead of) the second camera 50 along a direction in which the apparatus 100 is configured to move the glass substrate 200 on the stage 10. In this state, when the light irradiated from the second light source 40 is totally reflected on the surface of the glass substrate 200, an image with a gray background can be captured. In addition, when the light irradiated from the second light source 40 is irregularly reflected by the part of the glass substrate 200 and scattered light is generated, an image in which a part is shaded on a gray background can be captured.

The second optical system configured as described above is utilized as a modified dark field method, and may be advantageous for detecting a defect having a height or a depth, for example, a protrusion or a serrated dent.

The defect detection unit 60 may include a weight calculation unit 60a for calculating standard deviations for pixels of each region in the second image and calculating weights corresponding to each of the pixels using the standard deviations, an image generation unit 60b for applying the weights to the first image to generate a corrected first image, and a defect determination unit 60c for determining a defect of the glass substrate 200 using the corrected first image.

Embodiments of the present disclosure will be described in more detail with reference to a method for inspecting a glass substrate using the apparatus 100 for inspecting a glass substrate. Hereinafter, a configuration of the apparatus 100 for inspecting a glass substrate will be described with reference to FIGS. 1 and 2.

Figure 3:
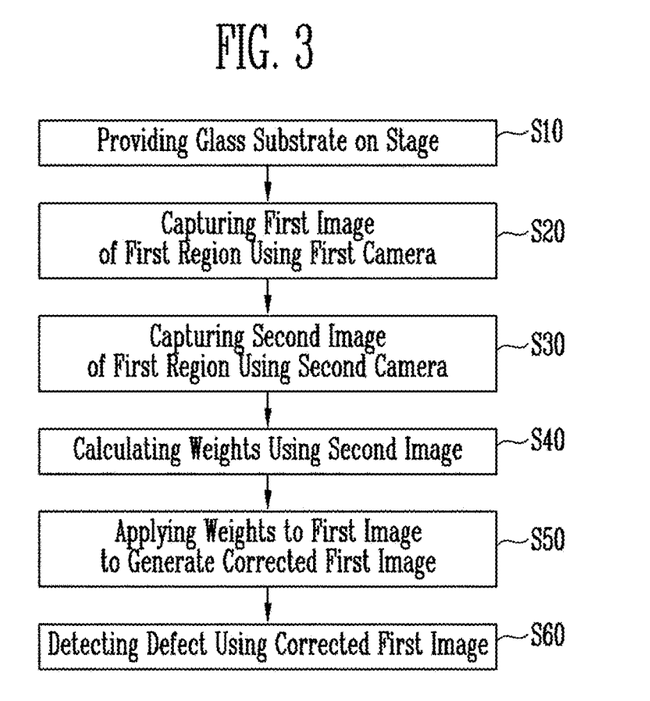
FIG. 3 is a flowchart illustrating a method for inspecting a glass substrate according to an embodiment of the present disclosure.

FIG. 3 is a flowchart illustrating a method for inspecting a glass substrate according to an embodiment of the invention.

Referring to FIG. 3, first, the glass substrate 200 as an object to be inspected may be provided on the stage 10 (S10).

Figure 4:
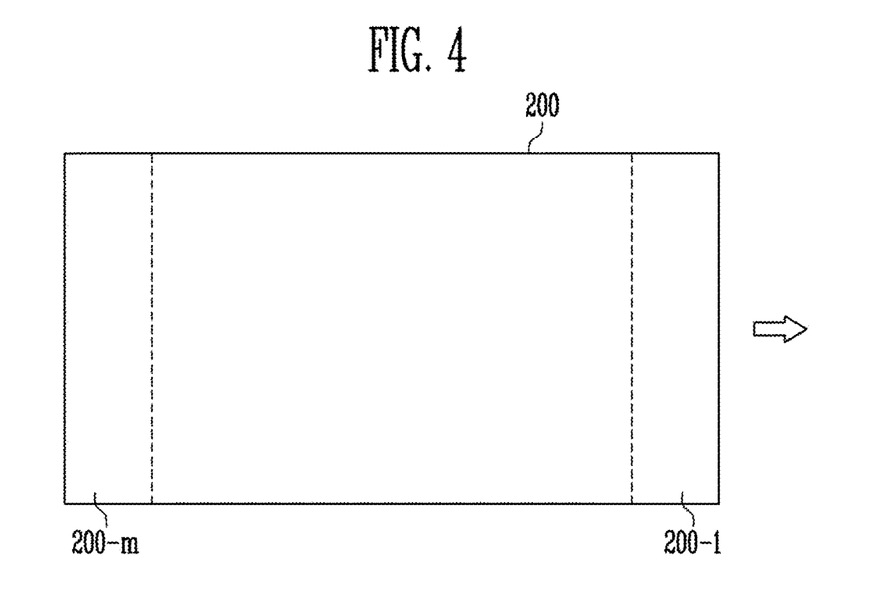
FIG. 4 is a plan view of an example of a glass substrate that may be inspected according to an embodiment of the present disclosure.

FIG. 4 is a plan view of an example of a glass substrate that may be inspected for defects (e.g., voids, cracks, scratches, and/or foreign matter) according to an embodiment of the present disclosure.

Although a rectangular glass substrate 200 is illustrated in FIG. 4, the glass substrate 200 may be square, polygonal, or circular.

Referring to FIG. 4, the glass substrate 200 may be provided such that a long side is parallel to a moving direction of the stage 10 and a short side intersects (e.g., is perpendicular to) the moving direction of the stage 10. In addition, the entire region of the glass substrate 200 may be divided into a plurality of regions defined by a line shape in a direction substantially perpendicular to the moving direction of the stage 10. For example, the glass substrate 200 may include a first region 200-1 to an m-th region 200-*m* defined in a line shape, where m is a natural number.

In the embodiment, the plurality of regions are described in a line shape for the sake of convenience, but the shape and number of regions may be changed as desired.

Referring to FIGS. 1 and 3, the first light source 20 may irradiate light to the first region 200-1 of the glass substrate 200 and the first camera 30 may capture a first image of the first region 200-1 of the glass substrate 200 (S20).

Referring to FIGS. 2 and 3, after the glass substrate 200 is moved in one direction by the stage 10 (as shown by the arrow in FIG. 2), the second light source 40 may irradiate light to the first region 200-1 of the glass substrate 200 and the second camera 50 may capture a second image of the first region 200-1 of the glass substrate 200 (S30).

In an embodiment, the first image and the second image may be successively obtained in a state in which both the first optical system and the second optical system are operated and the glass substrate 200 is moved by the stage 10.

The first image and the second image may be provided to the defect detection unit 60.

Figure 5:
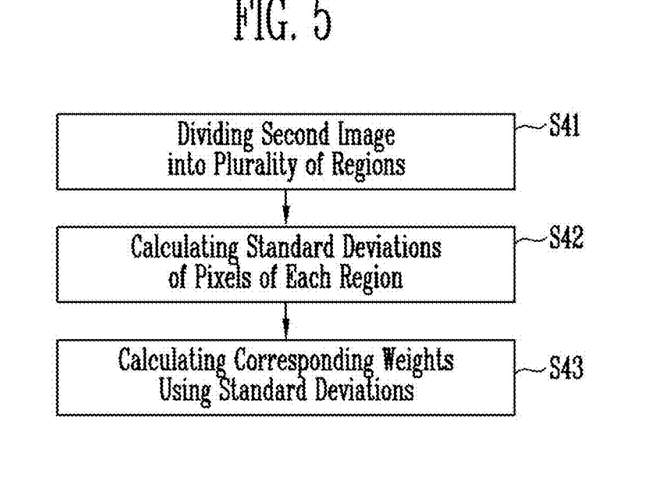
FIG. 5 is a flowchart illustrating tasks performed by operation of a defect detection unit shown in FIGS. 1 and 2 during the method of FIG. 3.
Figure 6:
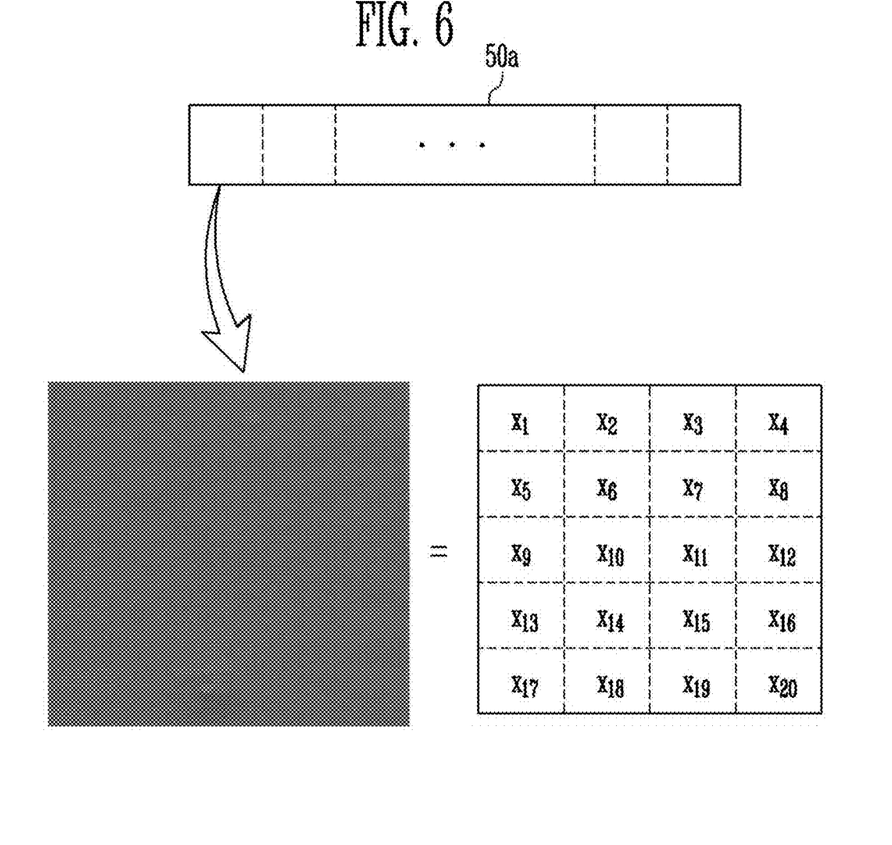
FIG. 6 is a diagrammatic example of a second image acquired during the method of FIGS. 3 and 5 and illustrating the calculation of grayscale value of pixels in regions of the second image.

FIG. 5 is a flowchart illustrating tasks performed by operation of the defect detection unit 60 to calculate weights of the second image according to the inspection method illustrated in FIG. 3. FIG. 6 is a diagrammatic example of a second image 50a acquired during the method of FIG. 3 and illustrates the calculation of grayscale value of pixels in regions of the second image 50a according to a task illustrated in FIG. 5.

Referring to FIGS. 3 to 5, the weight calculation unit 60a of the defect detection unit 60 may calculate weights corresponding to pixels using the second image 50a (S40).

First, during the task S40 of calculating the weights, the weight calculation unit 60a may divide the second image 50a into a plurality of regions as shown in FIG. 6 and calculate grayscale values of pixels of each region (S41).

Referring to FIG. 6, each of the pixels of each region may have a grayscale value $X_i$ (for example, i is 1 to 20). The gray level value $X_i$ may be a value within a range of 0 to 255.

In FIG. 6, the number of pixels is shown to be 20 for convenience of explanation, but the number of pixels is not limited thereto.

Next, during the task S40 of calculating the weights, the weight calculation unit 60a may calculate standard deviations of the pixels of each region using Equation 3 (S42).

$$s = \sqrt{\frac{\sum_{i=1}^{n}(X_i - \overline{X})^2}{n-1}} \quad \text{Equation 3}$$

Here, s is the standard deviation of the pixels in a given region of the second image 50a, n is a number of pixels in the given region of the second image 50a, $X_i$, is a grayscale value of an i-th pixel (i is a natural number from 1 to n) in the given region of the second image 50a, and $\overline{X}$ is an average grayscale value of the pixels in the given region of the second image 50a.

Figure 7:
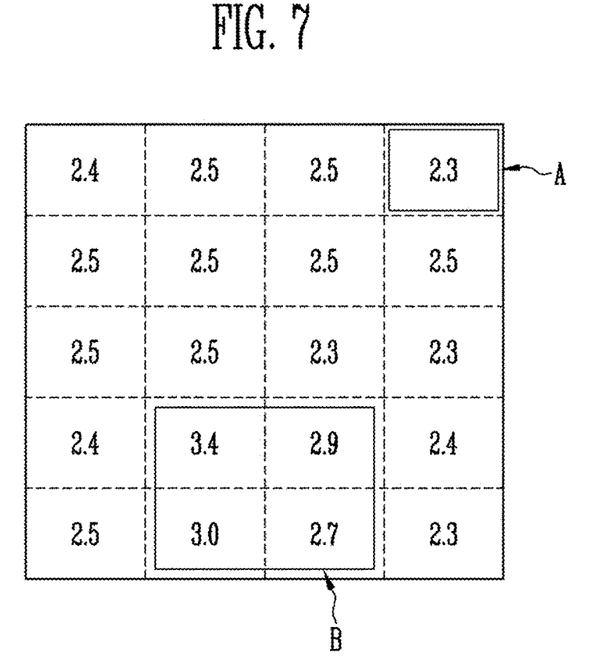
FIG. 7 is a diagram showing an example of standard deviations of the pixels in the regions of the second image calculated according to an embodiment of the present disclosure.

FIG. 7 is a diagram showing an example of the standard deviations of the pixels in the regions of the second image 50a calculated by Equation 3.

Referring to FIG. 7, a portion A having a relatively low standard deviation may be a normal region having no defect, and a portion B having a relatively high standard deviation may be a region having a high possibility that a defect exists.

Next, during the task S40 of calculating the weights, the weight calculation unit 60a may calculate weights corresponding to the pixels using the standard deviations (S43).

Figure 8:
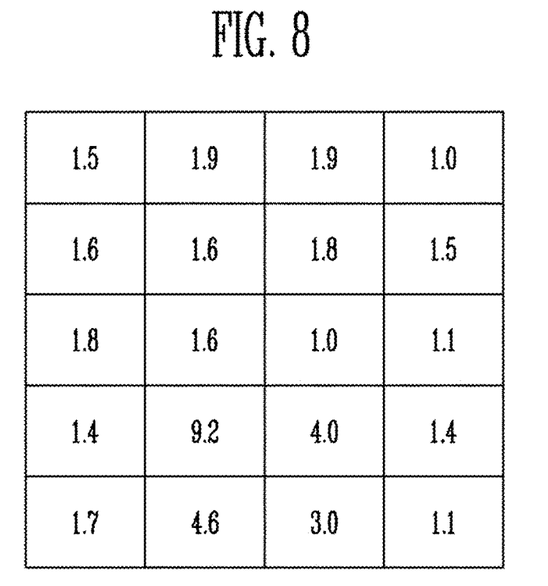
FIG. 8 is a diagram showing an example of weights calculated for the pixels of the second image based on the standard deviations shown in FIG. 7 according to an embodiment of the present disclosure.

FIG. 8 is a diagram showing an example of the weights calculated for the pixels of the second image 50a based on the standard deviations shown in FIG. 7.

The standard deviations for the pixels may be converted into the weights according to, for example, a reference value table.

Figure 9:
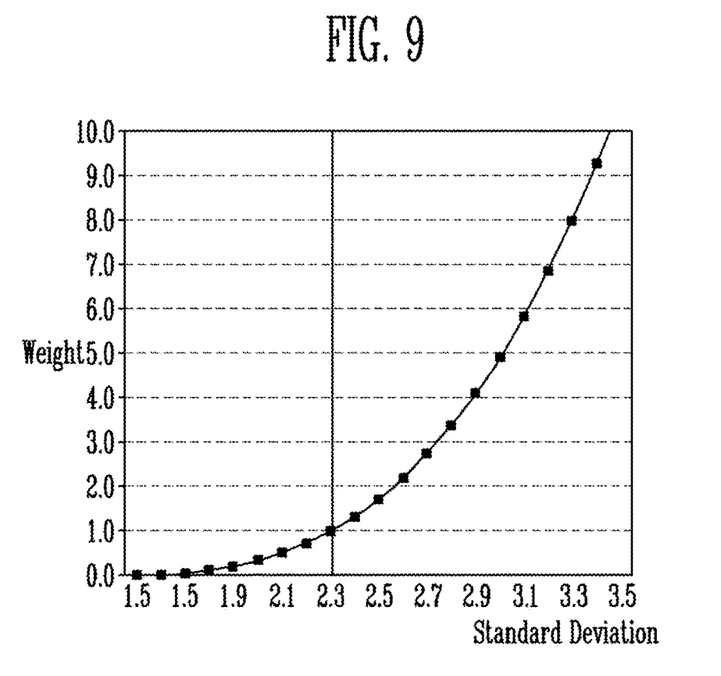
FIG. 9 is a graph illustrating an example of a reference value table according to an embodiment of the invention utilized to calculate the weights of the pixels of the second image from the standard deviations of the pixels.

FIG. 9 is a graph plotted according to one embodiment of the reference value table for calculating the weights from the standard deviations for the pixels of the second image 50a.

In FIG. 7, a standard deviation (2.3), which is determined as a region in which no defect exists, may be defined as a reference value (1.0). A corresponding weight may be assigned to each of a standard deviation lower than the standard deviation (2.3) and a standard deviation higher than the standard deviation (2.3). In an embodiment, the standard deviation lower than the standard deviation (2.3) and the standard deviation higher than the standard deviation (2.3) may be weighted with different ratios (slopes).

Referring to FIG. 9, the ratio (slope) may be expressed as a linear change depending on an experimental value or an experience value. For example, the standard deviation lower than the standard deviation (2.3) may indicate that a possibility of a defect may be low, and the standard deviation higher than the standard deviation (2.3) may indicate that a possibility of a defect may be high.

For example, weights of a gentle slope may be assigned to the standard deviations with a low possibility of a defect and weights of a steep slope may be assigned to the standard deviations with a high possibility of a defect, whereby the size and contour of the defect can be further emphasized.

Referring again to FIGS. 2 and 3, the image generation unit 60b of the defect detection unit 60 may apply the weights to corresponding pixels of the first image to generate a corrected first image (S50).

For example, the corrected first image may be generated by multiplying the weights by grayscale values of the corresponding pixels of the first image, respectively.

Figure 10A:
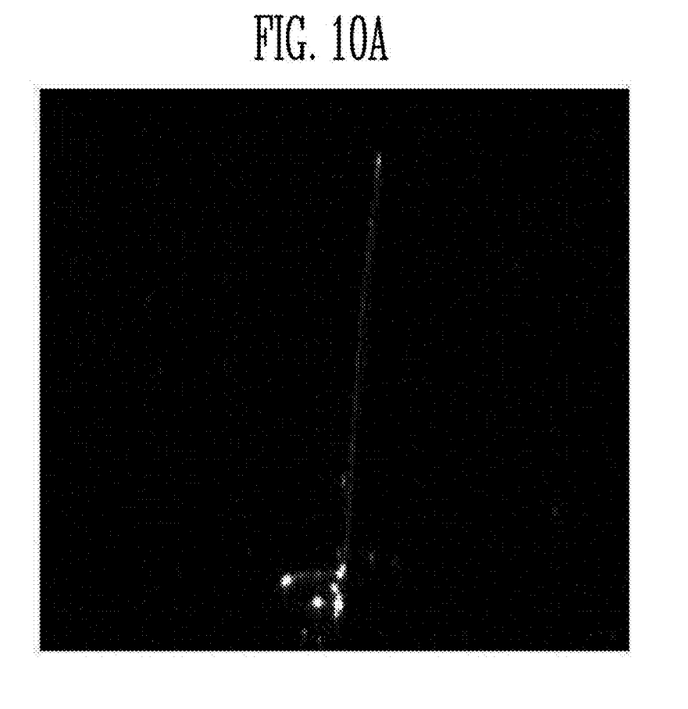
FIG. 10A is a photograph showing an example of a first image of FIG. 3.
Figure 10B:
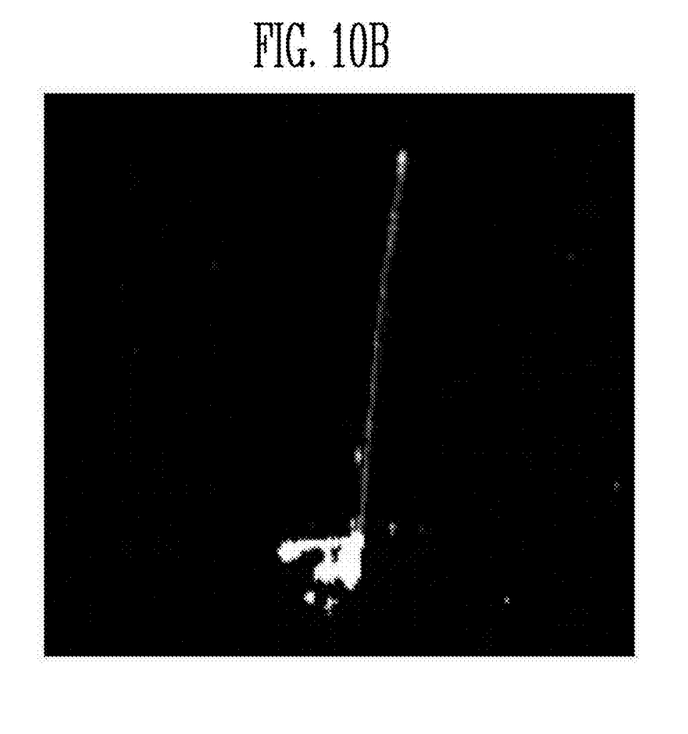
FIG. 10B is a photograph showing an example of a corrected first image acquired according to the method illustrated in FIG. 3.

FIG. 10A shows an example of the first image and FIG. 10B shows an example of the corrected first image.

In FIG. 10A, a contour of the defect (bright portion) present over a part of the region is somewhat unclear. In FIG. 10B, however, the size and contour of the defect (bright portion) are clearer.

The first image obtained by the first optical system is advantageous for binarization of image data, but may have varying brightness or low sharpness depending on the position and shape of the defect. On the other hand, the second image obtained by the second optical system may be advantageous for detecting the contour of the defect.

By applying the weights calculated from the second image to the first image through the above described process, the difference in sharpness between a portion where a defect does not exist and a portion where a defect exists can be clarified.

Next, the defect determination unit 60c of the defect detection unit 60 may detect a defect of the glass substrate 200 using the corrected first image (S60).

Figure 11:
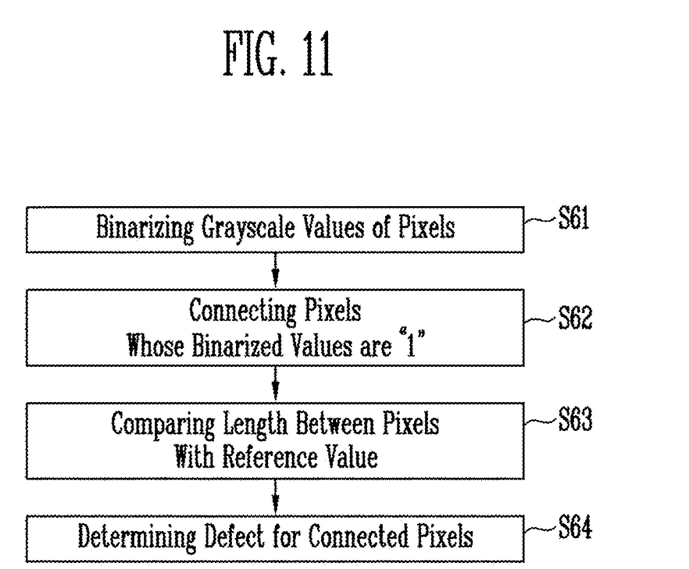
FIG. 11 is a flowchart illustrating tasks performed by operation of a defect determination unit during the method of FIG. 3.

FIG. 11 is a flowchart illustrating tasks performed by operation of the defect determination unit 60c utilized in the task S60 of the method illustrated in FIG. 3.

Referring to FIG. 11, the defect determination unit 60c may compare grayscale values of pixels of each region of the corrected first image with a threshold value to binarize the grayscale values (S61). Each of the grayscale values may be converted into "0" or "1" or "true" or "false" by the binarization.

For example, a grayscale value lower than the threshold value may be converted into "0" or "true" and a grayscale value higher than the threshold value may be converted into "1" or "false".

The threshold value is a reference value for defect determination and may be one or a plurality of values within a range of 0 to 255.

The defect determination unit 60c may connect pixels whose binarized values are "1" or "false" (S62) and compare an aggregate length of the pixels connected to each other with a reference value (S63).

When the pixels having the binarized values of "1" or "false" are connected to each other, only the pixels within a predetermined range (distance) can be connected.

When the aggregate length of the pixels connected to each other is greater than the reference value, the defect determination unit 60c may determine a defect (S64) and output the position and shape of the defect on the glass substrate 200 through, for example, a display unit.

For example, when the aggregate length of the pixels connected to each other is less than the reference value, the defect determination unit 60c may not determine a defect, and when the aggregate length of the pixels connected to each other is greater than the reference value, the defect determination unit 60c may determine the defect.

As another embodiment, the defect may be determined not only by comparing the aggregate length of the pixels connected to each other with the reference value, but also by comparing the aggregate area (aggregate size) of the pixels connected to each other with the reference value.

As another embodiment, the defect may be determined by a visual inspection by a user.

A process input rate of the glass substrate having a defect that does not affect the process can be increased through the above-described process, and the loss of manufacturing cost due to erroneous determination can be effectively prevented or at least reduced.

The entire region of the glass substrate 200 can be inspected by repeating the above-described process from the first region 200-1 to the m-th region 200-m of the glass substrate 200.

As described above, the embodiment of the invention obtains two different digital images using two different optical systems. Weights are calculated from one image, and the weights are applied to another image, so that the size and contour of a defect can be clarified.

A defect can be accurately and easily detected and erroneous determination depending on the angle of an optical system and the position and shape of the defect can be reduced. Therefore, the process input rate of the glass substrate can be increased, the defect occurrence rate is reduced, and the loss of manufacturing cost can be effectively prevented.

As described above, embodiments of the invention have been disclosed through the detailed description and the drawings. It is to be understood that the terminology used herein is for the purpose of describing the invention only and is not used to limit the scope of the invention described in the claims. Therefore, those skilled in the art will appreciate that various modifications and equivalent embodiments are possible without departing from the scope of the invention. Accordingly, the true scope of the invention should be determined by the technical idea of the appended claims.

What is claimed is:

1. An apparatus for inspecting a glass substrate, the apparatus comprising:
   a stage configured to support the glass substrate;
   a first light source for irradiating light onto a surface of the glass substrate at a first angle;
   a first camera for capturing scattered light of the light irradiated from the first light source;
   a second light source for irradiating light onto the surface of the glass substrate at a second angle greater than the first angle;
   a second camera for capturing reflected light and scattered light of the light irradiated from the second light source; and
   a defect detection unit for detecting a defect of the glass substrate using a first image provided by the first camera and a second image provided by the second camera,
   wherein the reflected light of the light irradiated from the second light source that is captured by the second camera does not include the light irradiated from the second light source having a reflection angle equal to an incident angle of the light irradiated from the second light source, and
   wherein the defect detection unit includes a weight calculation unit for calculating standard deviations for pixels of each region of a plurality of regions in the second image and calculating weights for each region of the plurality of regions in the second image using the standard deviations, and
   wherein the weight calculation unit is configured to divide the second image into the plurality of regions, and calculate the standard deviations using grayscale values and average grayscale values of the pixels of each region of the plurality of regions.

2. The apparatus of claim 1, wherein the stage includes a driving unit for moving the glass substrate in one direction.

3. The apparatus of claim 2, wherein the first light source and the first camera are positioned before the second light source and the second camera along the one direction.

4. The apparatus of claim 1, wherein the first and second cameras are arranged in a direction normal to the stage.

5. The apparatus of claim 1, wherein each of the first and second cameras is a line scan camera.

6. The apparatus of claim 1, wherein each of the first and second cameras includes one of a CMOS and a CCD.

7. The apparatus of claim 1, wherein the first and second light sources are configured to irradiate the light in a line.

8. The apparatus of claim 7, wherein each of the first and second light sources includes a plurality of LEDs arranged in a bar shape.

9. The apparatus of claim 1, wherein the defect detection unit includes:
   an image generation unit for applying the weights to the first image to generate a corrected first image; and
   a defect determination unit for determining a defect of the glass substrate using the corrected first image.

10. The apparatus of claim 9, wherein each standard deviation of the standard deviations is calculated by following equation 1:

$$s = \sqrt{\frac{\sum_{i=1}^{n}(X_i - \overline{X})^2}{n-1}} \quad \text{Equation 1}$$

wherein s is the standard deviation of one region of the plurality of regions, n is a number of pixels of the one region, $X_i$ is a grayscale value of an i-th pixel (i is a natural number from 1 to n) of the one region, and $\overline{X}$ is an average grayscale value of the pixels of the one region.

11. A method for inspecting a glass substrate, the method comprising:

providing the glass substrate;

irradiating light from a first light source to a first region of the glass substrate and capturing a first image of the first region of the glass substrate using a first camera;

irradiating light from a second light source to the first region of the glass substrate and capturing a second image of the first region of the glass substrate using a second camera;

calculating weights corresponding to pixels of the second image;

applying the weights to pixels of the first image to generate a corrected first image; and detecting a defect of the glass substrate using the corrected first image, wherein reflected light of the light irradiated from the second light source that is captured by the second camera does not include the light irradiated from the second light source having a reflection angle equal to an incident angle of the light irradiated from the second light source, and wherein the calculating the weights includes dividing the second image into a plurality of regions, and calculating standard deviations for pixels of each of the plurality of regions using grayscale values and average grayscale values of the pixels of each of the plurality of regions.

12. The method of claim 11, wherein the glass substrate is moved in one direction while inspecting the glass substrate.

13. The method of claim 11, wherein the first camera captures scattered light of the light irradiated from the first light source.

14. The method of claim 11, wherein the second camera captures the reflected light and scattered light of the light irradiated from the second light source.

15. The method of claim 11, wherein the calculating the weights includes:

converting the standard deviations for each of the pixels into weights according to a reference value table.

16. The method of claim 15, wherein each of the standard deviations is calculated by following equation 2:

$$s = \sqrt{\frac{\sum_{i=1}^{n}(X_i - \overline{X})^2}{n-1}} \quad \text{Equation 2}$$

wherein s is a standard deviation, n is a number of pixels, $X_i$ is a grayscale value of an i-th pixel (i is a natural number from 1 to n), and $\overline{X}$ is an average grayscale value of the pixels.

17. The method of claim 11, wherein the corrected first image is generated by multiplying grayscale values of the pixels of the first image by the weights.

18. The method of claim 11, wherein the detecting the defect of the glass substrate includes:

comparing grayscale values of pixels of each region of the corrected first image with a threshold value to binarize the grayscale values;

connecting pixels having binarized values of 1 to each other; and determining the defect when an aggregate length of the pixels connected to each other is greater than a reference value.

19. The method of claim 18, wherein the connecting the pixels includes:

connecting only the pixels within a predetermined range.

* * * * *